United States Patent [19]

Blankenship et al.

[11] Patent Number: 5,096,342
[45] Date of Patent: Mar. 17, 1992

[54] APPARATUS FOR DRILLING COMPOSITE STRUCTURES

[75] Inventors: Tom Blankenship, Marthasville, Mo.; Ralph Compton, Granite City, Ill.; John Griffith, Ballwin, Mo.

[73] Assignee: McDonnell Douglas Corporation, St. Louis, Mo.

[21] Appl. No.: 632,927

[22] Filed: Dec. 24, 1990

[51] Int. Cl.⁵ .............................................. B23B 47/00
[52] U.S. Cl. ..................................... 408/112; 408/113; 408/241 S
[58] Field of Search ............... 408/72 R, 87, 95, 110, 408/202, 241 S, 14, 15, 67, 112, 113

[56] References Cited

U.S. PATENT DOCUMENTS

| | | | |
|---|---|---|---|
| 2,301,151 | 11/1942 | Spievak | 408/112 |
| 2,308,055 | 1/1943 | Cogsdill | 408/202 |
| 2,359,859 | 10/1944 | Jarvis | 408/202 |
| 2,409,377 | 10/1946 | Miller | 408/112 |
| 2,608,114 | 8/1952 | Martin et al. | 408/202 |
| 2,710,549 | 6/1955 | Cogsdill | 408/202 |
| 3,028,774 | 4/1962 | Hausser et al. | 408/202 |
| 3,060,772 | 10/1962 | Crump | 408/202 |
| 3,527,273 | 9/1970 | Falter | 408/113 |
| 4,037,982 | 7/1977 | Clement | 408/110 |
| 4,764,060 | 8/1988 | Khurana | 408/202 |
| 4,802,798 | 1/1989 | Adamson | 408/112 |

*Primary Examiner*—Daniel W. Howell
*Attorney, Agent, or Firm*—Benjamin Hudson, Jr.; Gosnell, Guy R.; Courson, Timothy H.

[57] ABSTRACT

There is provided by this invention an apparatus for drilling composite materials which provides controlled depth drilling. In a first embodiment of the invention, a drill motor is integrated within a microstop cage and retained by a lock nut, such that by extending or shortening the microstop cage the depth of the hole drilled is decreased or increased, respectively. The drill motor is urged towards the composite surface against spring pressure which, in conjunction with a stop collar, limits the depth of the hole drilled. Furthermore, the spring facilitates the retraction of the drill bit from the composite surface. Alternatively, the depth of a hole may be incrementally controlled by the amount that a stop cage is threaded onto an attachment sleeve that in turn is attached to the drill motor. The further the stop cage is threaded onto the attachment sleeve, the deeper the hole drilled will be as more of the drill bit will be exposed beyond the stop cage. Conversely, the less the stop cage is threaded onto the attachment sleeve, the more shallow the hole will be as less of the drill bit will be be exposed beyond the stop cage.

5 Claims, 2 Drawing Sheets

APPARATUS FOR DRILLING COMPOSITE STRUCTURES

BACKGROUND OF THE INVENTION

1. Field of the Invention

The present invention relates generally to an apparatus for drilling holes, and more particularly to an apparatus for drilling holes in composite materials with the depth of the holes being controllable.

2. Description of the Prior Art

In composite structures, holes sometimes must be drilled so that resin may be injected to fill delaminations, cracks, or voids that have developed. The holes must be drilled to a specific depth and in a specific location so that the resin introduced at the composite surface can flow through the drilled hole to fill the delamination, crack, or void.

Drills have been utilized previously that were capable of drilling through the composite material, but the depth of the hole depended upon the operator's discretion. The operator was thus forced to guess when the drilling should cease in order to have a hole drilled to the delamination, crack, or void without having the hole be either too short or too long. As the size of the delamination, void, or crack to be filled decreases, sometimes to 0.002 inches, it is extremely difficult for the operator to accurately gauge the depth of the hole.

It would be desirable to develop an apparatus for drilling composite materials that was capable of controlling the drilling depth. Furthermore, it would be desirable for the apparatus for drilling composite materials to be portable and be able to operate over a wide range of drilling speeds.

SUMMARY OF THE INVENTION

There is provided by this invention an apparatus for drilling composite materials which provides controlled depth drilling. In a first embodiment of the invention, a drill motor is integrated within a microstop cage and retained by a lock nut, such that by extending or shortening the microstop cage the depth of the hole drilled is decreased or increased, respectively. The drill motor is urged towards the composite surface against spring pressure which, in conjunction with a stop collar, limits the depth of the hole drilled. Furthermore, the spring facilitates the retraction of the drill bit from the composite surface. Alternatively, the depth of a hole may be incrementally controlled by the amount that a stop cage is threaded onto an attachment sleeve that in turn is attached to the drill motor. The further the stop cage is threaded onto the attachment sleeve, the deeper the hole drilled will be as more of the drill bit will be exposed beyond the stop cage. Conversely, the less the stop cage is threaded onto the attachment sleeve, the more shallow the hole will be as less of the drill bit will be exposed beyond the stop cage.

DETAILED DESCRIPTION OF THE PREFERRED EMBODIMENT

Figure 1:
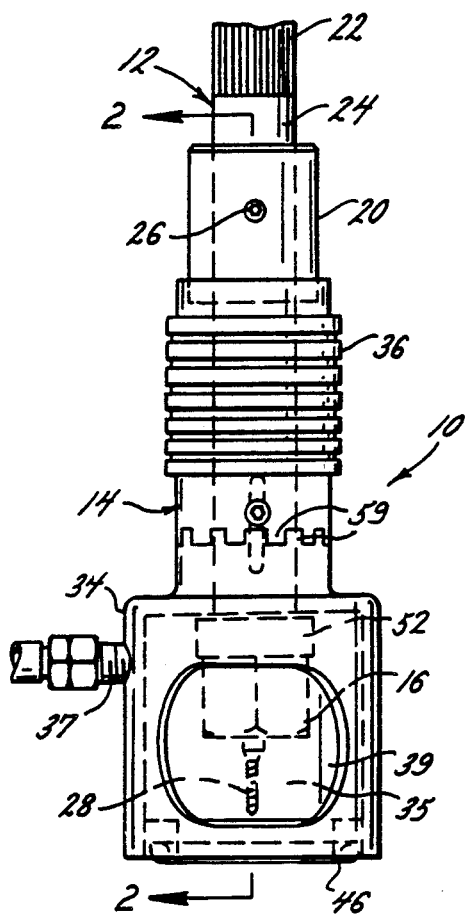
FIG. 1 is a side view of an apparatus for drilling composite materials.
Figure 2:
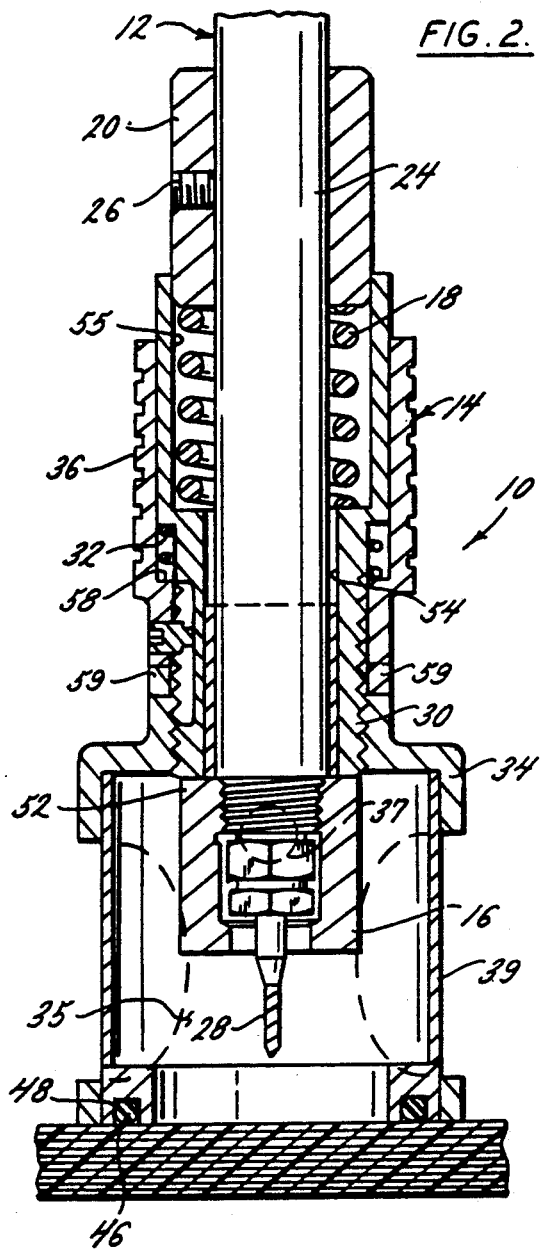
FIG. 2 is a sectional view of an apparatus for drilling composite materials.

An apparatus 10 for drilling composite materials, as shown in FIGS. 1 and 2, comprises a drill motor 12, a microstop cage 14, a lock nut 16, a spring 18, and a stop collar 20. The drill motor 12, as shown in FIG. 1, is an air driven motor, but may also be electrically driven as in well known to those skilled in the art. The drill motor 12 is driven by an external pressurized air system which is connected to drill motor 12 by an air line 22.

The stop collar 20 is placed on the shaft 24 of the drill motor and is secured by means of set screw 26. The spring 18 is also placed on the shaft 24 of the drill motor such that one end of the spring is adjacent to the stop collar 20. The microstop cage 14 is placed on the shaft 24 such that it also contacts the spring 18. The lock nut 16 is then threadably connected to the shaft 24 to retain the drill motor 12 within the microstop cage 14.

Figure 3:
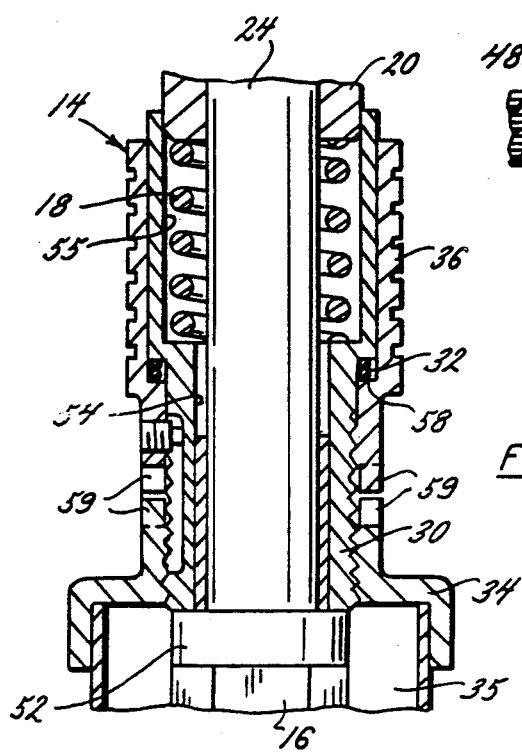
FIG. 3 is a sectional view of a microstop cage incorporated by an apparatus for drilling composite materials.

As shown in FIG. 3, the microstop cage 14, typically used in countersink operations, is composed of four sections: a threaded sleeve 30, an internal spring 32, a nose section 34, and a rear section 36. The nose section 34 may have a large opening 35 so that an external vacuum attachment may be introduced to remove the chip swarf. Alternatively, the large openings may be sealed with a plastic cover 39 and an external vacuum source may be introduced into the nose section 34 through a vacuum port 37 as is well known in the art to evacuate the chip swarf.

The microstop cage 14 is placed on the shaft 24 of the drill motor by first placing the threaded sleeve 30 onto the shaft 24 such that the sleeve 30 is adjacent to the spring 18. The sleeve has a first larger interior diameter 55 and a second smaller interior diameter 54. The spring 18 has a diameter that is larger than the second diameter 54, but smaller than the first diameter 55 such that the spring may be inserted into the sleeve 30 until it contacts the second diameter 54 at which time it is retained in position. The spring 18 is then positioned between the second interior diameter 54 of the threaded sleeve 30 and the stop collar 20. The internal spring 32, is subsequently placed on the threaded sleeve 30 such that a first end of the internal spring 32 contacts the portion of the threaded sleeve 30 having the larger diameter 55 and is restrained from further advancement on the drill shaft 24. The rear section 36 is next installed by being fit on the shaft 24 of the drill motor so that the internal ridge 58 of the rear section 36 contacts the internal spring 32 such that the internal spring 32 is held in position between the portion of the threaded sleeve 30 having the larger diameter 55 and the internal ridge 58 of the rear section 36. To complete the installation of the microstop cage 14, the nose section 34 is threadably engaged by the threaded sleeve 30.

The position of the nose section 34 is set by the interlocking of the serrations 59 contained by both the nose section 34 and the rear section 36. The interlocking of the serrations 59 is due to the internal spring 32 which urges the rear section 36 forward, toward the surface to be drilled, and into contact with the nose section 34. The depth of drilling is controlled by the length of the microstop cage 14 which in turn is determined by the position of the nose section 34 on the threaded sleeve 30. The further the nose section 34 is threaded onto the sleeve 30, the deeper the hole drilled will be. Alternatively, the less the nose section 34 is threaded onto the sleeve 30, the more shallow the hole drilled will be. In order to adjust the depth of drilling, the serrations 59 of the nose section 34 and the rear section 36 must be separated by forcing the rear section 36 rearward, away from the surface to be drilled, so as to compress the spring 18. Once the serrations 59 are separated, the nose section 34 may be rotated so as to thread the nose section 34 further on the sleeve 30 or to thread the nose section 34 so that it is not advanced as far on the sleeve 30. Subsequently, the rear section 36 is allowed to return to its position adjacent to the nose section 34 such that the serrations 59 again interlock.

The microstop cage 14 also has an o-ring 46 set in a circular groove 48 that has been machined into the front end 40 of the microstop cage 14. The o-ring 46 serves to protect the composite surface from unnecessary scrape marks.

The lock nut 16 has a cylindrical cavity extending throughout its length through which the drill bit 50 passes. The lock nut 16 has a flanged end 52, located nearest the drill motor 12, which serves to restrict the drill motor's rearward movement. The exterior diameter of the flanged end 52 of the lock nut is larger than the interior diameter of the serrated section 32 or the microstop cage 14. Thus, the spring 18 may only force the drill motor 12 to be retracted to the length at which the flanged end 52 of the lock nut contacts the microstop cage 14.

The depth of the drilling is controlled by the amount by which the microstop cage 14 adjustment limits the forward movement of the drill motor since as the drill begins boring a hole, the drill bit 50 will enter the composite material and the spring 18 will be forced to compress so as to allow the microstop cage 14 to slide over the stop collar 20. Once the spring 18 has reached its maximum compression, the drill is restrained from further drilling since the microstop cage 14 can not be retracted any more. Thus, the more the microstop cage 14 is extended, the more shallow the hole drilled will be. Conversely, the more the microstop cage 14 is shortened, the deeper the hole drilled will be.

Figure 4:
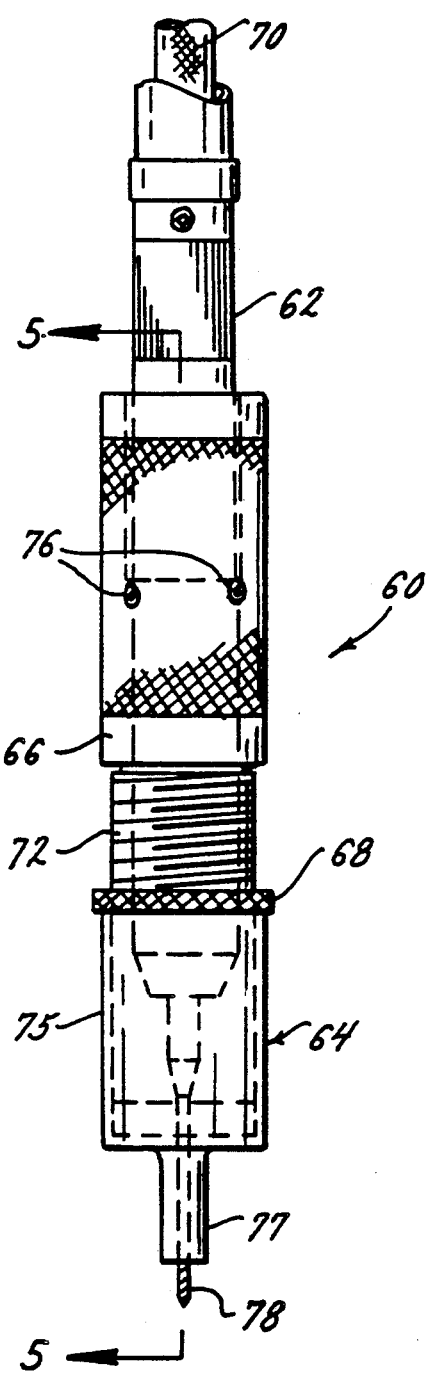
FIG. 4 is a side view of an alternative embodiment of an apparatus for drilling composite materials.
Figure 5:
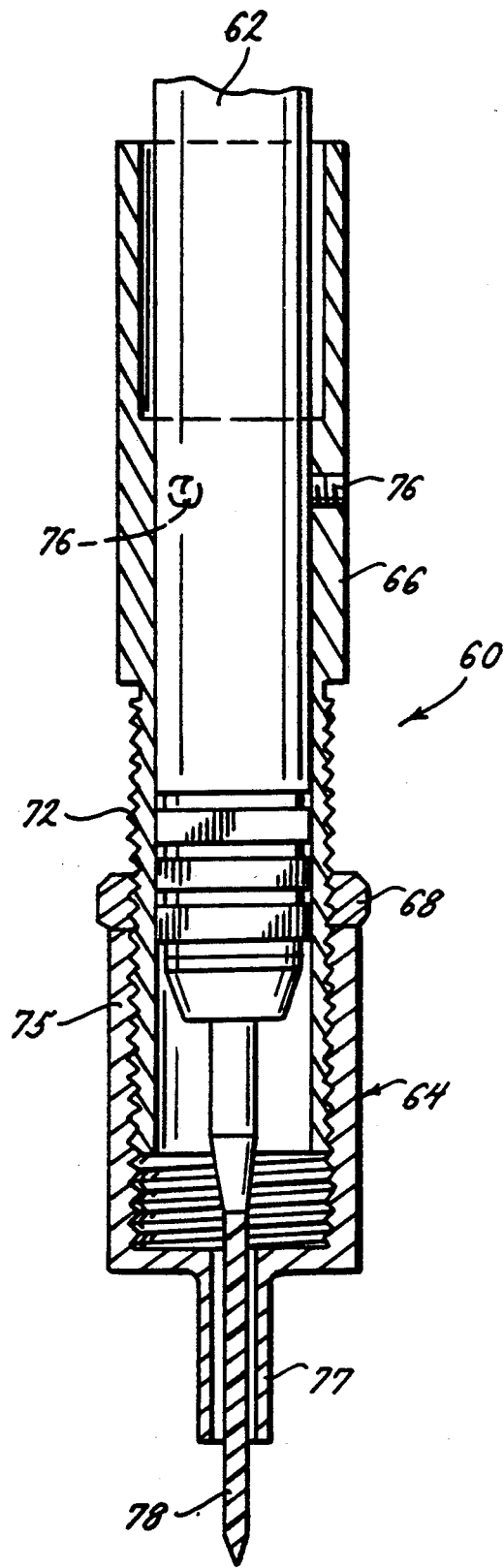
FIG. 5 is a sectional view of an alternative embodiment of an apparatus for drilling composite materials.

An alternative embodiment of an apparatus for drilling composite structures 60 is shown in FIGS. 4 and 5. The drilling apparatus 60 is comprised of a drill motor 62, an adjustable stop cage 64, an attachment sleeve 66, a locking collar 68. While the drill motor 62 may be driven by various sources, as previously discussed, the drill motor 62 shown in FIG. 4 is driven by air supplied by an external air supply to an air line 70 which is connected to the drill motor 62 in a manner well known to those skilled in the art.

The attachment sleeve 66 is placed over the shaft of the drill motor 62 and secured by set screws 76. The locking collar 68 is threaded onto the threaded end 72 of the attachment sleeve 66. Subsequently, the adjustable stop cage 64 is threaded onto the attachment sleeve 66, however, the stop cage 64 can only be threaded until it contacts the locking collar 68 at which point its position is set.

The adjustable stop cage 64 is comprised of a internally threaded portion 75 and a guide portion 77. The threaded portion 75 has an internal cylindrical cavity that is threaded so as to interface with the threaded end 72 of the attachment sleeve 66. The guide portion 77 has a much smaller diameter, although it also has an internal cylindrical cavity through which the drill bit 78 protrudes. The guide portion 77 serves to control the bit's lateral movement in order to minimize drill bit breakage.

The depth of the hole to be drilled is controlled by the position of the locking collar 68 on the attachment sleeve 66. Once the locking collar 68 is positioned, the stop cage 64 is threaded onto the attachment sleeve 66 until it contacts the locking collar 68 at which point its position is fixed. The depth of the hole bored will then be equal to the amount by which the drill bit 78 extends beyond the guide portion 77 of the stop cage 64.

For both embodiments, the depth of the hole is capable of being controlled to within 0.002 inches. Additionally, the drill motors are capable of operating over a wide range of speeds, such as from 20,000 rpm to 100,000 rpm. Furthermore, both embodiments are portable and are able to be used in confined spaces due to their small size and light weight.

Although there has been illustrated and described specific detail and structure of operations, it is clearly understood that changes and modifications may be readily made therein by those skilled in the art without departing from the spirit and the scope of the invention.

We claim:

1. An apparatus for drilling holes, comprising:
    a) a drill motor having a first end and a second end; said first and second ends being connected by a shaft;
    b) a drill bit retained by the first end of the drill motor;
    c) a stop collar affixed to the shaft of the drill motor;
    d) a means for controlling the depth of a drilled hole movably positioned on the shaft of the drill motor;
    e) a lock nut threadably connected to the first end of the drill motor such that the drill bit protrudes through the lock nut; said lock nut retaining the depth controlling means on the shaft of the drill motor; and
    f) a spring positioned on the shaft of the drill motor between the stop collar and the depth controlling means such that the depth controlling means is urged toward the first end of the drill motor.

2. An apparatus for drilling holes, as recited in claim 1, wherein the length of the depth controlling means may be adjusted such that the depth of the hole is modified.

3. An apparatus for drilling holes as recited in claim 2 wherein said depth controlling means has a vacuum chamber.

4. An apparatus for drilling holes, as recited in claim 3, further comprising a means for extracting chip swarf from the vacuum chamber of the depth controlling means.

5. An apparatus for drilling holes, as recited in claim 4 wherein said extraction means further comprises:
    a. an external vacuum source and
    b. a vacuum port interconnecting the vacuum chamber of the depth controlling means and the external vacuum source.

* * * * *